United States Patent Office 3,342,620
Patented Sept. 19, 1967

3,342,620
PLASTIC SULPHUR COMPOSITION
Georges Molinet, Lacq, and Bernard Audouze, Pau,
France, assignors to Societe Nationale des Petroles
d'Aquitaine, Paris, France
No Drawing. Filed May 4, 1964, Ser. No. 364,830
Claims priority, application France, May 6, 1963,
933,847; Nov. 12, 1963, 953,326
8 Claims. (Cl. 106—287)

The invention relates to a new sulphur composition, namely, a material formed by sulphur to which an organic thio compound is added. It is also concerned with a process for the preparation of this material.

Various products based on sulphur and resins are known and are used for certain purposes, but they generally have the defect of being more or less cold-short, or on the contrary, of softening too much under the effect of heating.

The present invention provides a new product, of which the outstanding rheological and mechanical properties, combined with an excellent chemical resistance, permit of numerous applications to which the known sulphur compositions are not adapted in a satisfactory manner. The product according to the invention may more particularly be obtained in a fairly pliable form so that it can be easily shaped, while having a high resistance to wear; such a product is especially suitable for all types of coverings, and especially for those on floors and walls.

The new product according to the invention is a plastic material formed by the homogeneous union of molten sulphur with an optionally modified polythioformaldehyde.

In the preferred product, the proportion by weight of elementary sulphur is higher than that of the polythioformaldehyde with which it is associated; in other words, the proportion of sulphur is higher than 50%.

Materials of particular interest for certain uses, such as those indicated above, contain only 2 to 15 parts of polythioformaldehyde to 98 to 85 parts by weight of sulphur. Excellent coatings are obtained with a product in which the respective proportions of these two constituents are 3 to 10 for 97 to 90.

One of the quite unexpected characteristics of the new materials according to the invention is their flexibility, even in the case where they are constituted for the major part of sulphur (for example 90 to 97% by weight), the polythioformaldehyde only being present in a very small proportion as an adjuvant of the sulphur. This adjuvant then plays the part of a true plasticiser for the sulphur.

Although poly thioformaldhydes of different molecular weights may be included in the composition of the product according to the invention, it is advantageous to employ oligomers of the type $HS-(CH_2S)_n-H$, comprising 3 to 7 ($CH_2S$) groups, titrating about 62 to 72% of sulphur and melting between 70° and 120° C. Particularly interesting results are obtained with polythioformaldehyde oligomers which are liquid at normal temperature and of which the average number of $CH_2S$ groups is from 3 to 4 and the sulphur content is 72 to 76%.

On the other hand, the properties of the product can be modified in the desired direction, not only by the use of variable proportions of sulphur, but also by the modification of the molecule of the polythioformaldehyde which is used; in particular, it is possible for the sulphur to have added thereto compounds or polycondensates of thioformaldehyde with substances such as phenols, urea, thiourea, dicyandiamide, styrene, maleic acid or others.

It is sometimes advantageous to combine with the sulphur a mixture of polythioformaldehyde with one or more of the poly compounds of the type inidicated above.

Compositions having particularly good qualities are obtained by condensation products of ketones with polythioformaldehydes being used as adjuvants to the sulphur.

The polycondensates, i.e. polythioformaldehyde-ketone condensation products, which are applicable to the present invention may originate from the condensation of different alkyl, aryl and alkylaryl ketones, and/or cycloparaffinic ketones, with different polythioformaldehydes or dithiol polythioethers, it being understood that a like polymer can originate from several different ketones.

By way of non-limitative examples, it is possible to use polycondensates obtained from ketones such as acetone, methylethylketone, diethyl ketone or 3-pentanone, hexanones, heptanones, octanones, benzophenone, acetophenone, acetonyl acetate, acetiphenone acetone, acetyl acetone, fluorenone or diphenylene ketone, phenyl acetophenones, cyclopentanone, cyclohexanone, etc.

The polycondensates which are used are obtained by the reaction of the ketones with various polythioformaldehydes of the type $HS-(CH_2S)_n-H$, of which the number $n$ of $-CH_2S-$ groups may vary; this number can for example be from 2 to 7 and particularly from 3 to 4. The product employed is usually the result of the condensation of a ketone with a mixture of polythioformaldehydes having different values for $n$.

According to one preferred embodiment, the polycondensate added to the sulphur is formed by the condensation of the ketone with one or more thioformaldehyde oligomers which are liquid at normal temperature. Excellent results are obtained with oligomers of which the average number $n$ is from 3 to 4 and liquid at ambient temperature.

One process for the preparation of polycondensates of ketones with polythioformaldehydes consists in combining one or more ketones with a liquid $HS(CH_2S)_nH$ oligomer, in which the mean value of $n$ is from 3 to 4; the mixture is kept in the presence of an acid catalyst, optionally in a solvent, at a temperature from $-20°$ to $+100°$ C. until a viscous product is obtained. The catalyst can for example be $H_2SO_4$, gaseous HCl, $ZnCl_2$, etc. The viscous product, separated from the reaction medium and washed, is added to the sulphur according to the present invention.

The polycondensates which are used can contain variable numbers of ketone molecules per thioformaldehyde molecule; very good results are obtained with polymers resulting from the condensation of one mol of ketone, or a number of mols of the order of 1, particularly 1 to 1.5, per mol of oligomer containing 3 to 4 $-CH_2S-$ groups.

Like the majority of known plastic compositions, the product according to the invention can contain various inert fillers, for example, powders, fibres, flakes, filaments or the like consisting of mineral or organic materials: metal oxides, carbonates, sulphides, carbides, phosphates, silicates, glass, asbestos, cellulosic substances etc.

Various colouring agents and/or pigments can be incorporated into the plastic sulphur materials according to the invention.

The process for the preparation of the new product consists in mixing the molten sulphur with the polythioformaldehyde or polythioformaldehydes and optionally adjuvants such as loading agents, pigments, colouring agents or others.

One particularly advantageous form of the process resides in previously melting the sulphur and adding to the molten mass the predetermined quantity of polythioformaldehyde and/or a polycompound or a polycondensate of thioformaldehyde, with suitable agitation for satisfactorily homogenising the composition.

The molten mass which is obtained can easily be poured into moulds in order to mould the desired articles.

In order to illustrate the invention, several nonlimitative examples are given below.

EXAMPLE 1

8 kg. of solid polythioformaldehyde with about 65% of sulphur were added in small portions to 92 kg. of molten sulphur, brought to 170° C.; the hot liquid mass was carefully mixed for 45 minutes. 0.5 kg. of a yellow pigment and 0.8 kg. of finely powdered calcium carbonate were incorporated thereinto.

The composition obtained was plastic after it had cooled, while having a high resistance to wear. It was used for establishing yellow warning lines on roads; for this purpose, the composition was applied while hot, more especially at about 170° C.

EXAMPLE 2

To 95 kg. of molten sulphur, brought to about 170° C., there were added in small fractions and within 30 minutes, 5 kg. of liquid polythioformaldehyde having substantially the composition $HS(CH_2S)_{3.4}H$ and the following characteristics:

Percent by weight of SH_____ 34.7
Percent by weight of total S_____ 73.0
Percent by weight of HCHO_____ 0.3
Percent by weight of $H_2O$_____ 0.08

Molecular weight: 190; density 1.36 at 20° C.
Solification temperature +5° C.
Refractive index 1.670 at 20° C.

The mixture was kept at about 170° C., and the stirring was continued for 1 hour. Towards the end, 1 kg. of ultramarine blue was added while homogenising the complete mixture. The composition thereby obtained was poured onto staircase steps in order to serve as a resistant and sound-proofing plastic coating.

EXAMPLE 3

62 kg. of pulverulent sulphur were mixed with 38 kg. of liquid polythioformaldehyde $[HS(CH_2S)_nH]$, with a molecular weight of 210, in which $n=3.85$ and the sulphur content is 74%. The mixture was heated to between 155° and 160° C. for 1½ hours until well homogenised and a filler consisting of 30 kg. of dry kaolin was added while still hot. There was thus obtained a flexible mastic, useful for plugging cracks and crevasses in concrete or stone slabs.

EXAMPLE 4

*Preparation of acetone-polythioformaldehyde polycondensate*

In a spherical flask equipped with a reflux condenser, 950 parts by weight of liquid dithiopolythioether with molecular weight of 190 (i.e. a polythioformaldehyde oligomer) are dissolved in 360 parts by weight of acetone. 70 parts by weight of concentrated sulphuric

acid are slowly added dropwise. The temperature rises to 70° C. The mixture is kept at this temperature while stirring for 1 hour. The mixture is then decanted and its lower part is drawn off, this then being washed until neutral in boiling water. There are obtained 1000 parts of a colourless viscous liquid, which constitutes the desired polycondensate.

EXAMPLE 5

*Preparation of acetone-polythioformaldehyde polycondensate in the cold*

In a spherical flask equipped with a reflux condenser, 350 parts of acetone are dissolved in 879 parts of benzene. This solution is cooled to —5° and gaseous and dry HCl is slowly bubbled therethrough while stirring. A solution of 950 parts of the same dithiopolythioether as in Example 4, dissolved in 1320 parts of benzene, is slowly added. The temperature is kept at —5° C. On completing the addition of the benzene solution, 1000 parts of a colourless viscous liquid are precipitated by adding 400 parts of methanol.

EXAMPLE 6

*Preparation of cyclohexanone-polythioformaldehyde polycondensate*

In a spherical flask equipped with a reflux condenser, 950 parts of the same dithiopolythioether as in Example 4 are dissolved in 500 parts of cyclohexanone. 64 parts of concentrated $H_2SO_4$ are slowly added dropwise. The mixture is kept at a temperature of 100° C. for 1 hour. It is then decanted and the lower part is washed with boiling methanol and boiling water. There are obtained 1250 parts of a transparent, slightly yellow and very viscous liquid polycondensate.

EXAMPLE 7

*Preparation of methylisobutyl ketone-polythioformaldehyde polycondensate*

In an apparatus similar to that used above, 550 parts of methylisobutyl ketone are dissolved in 879 parts of benzene. The mixture is cooled to —10° C., and gaseous and dry HCl is caused to bubble therethrough while stirring. A solution of dithiopolythioether in 1320 parts of benzene is slowly added. The temperature is kept at —10° C. At the end of the reaction, 1170 parts of a colourless and very viscous liquid is precipitated with 400 parts of methanol, the said liquid constituting the desired polycondensate.

EXAMPLE 8

*Preparation of benzophenone-polythioformaldehyde polycondensate*

In an apparatus similar to that used above, 1000 parts of benzophenone are dissolved in 1320 parts of benzene and the solution is cooled to —0° C. 10 parts of anhydrous zinc chloride are added. Gaseous and dry HCl is caused to bubble therethrough. A solution of 950 parts of dithiopolythioether in 879 parts of benzene is slowly added thereto. The temperature is kept at 0° C. After the reaction, 400 parts of methanol are added. A very viscous liquid which is light yellow in colour is decanted.

EXAMPLE 9

10 kg. of a polythioformaldehyde-acetone condensate were added in small portions to 90 kg. of molten sulphur, brought to 160° C., the composition of the condensate corresponding substantially to 1 mol of acetone per mol of oligomer containing 3 to 4 $CH_2S$ groups. This polycondensate had been prepared by reaction of the acetone with a liquid polythioformaldehyde in the presence of HCl as catalyst (Example 5). The liquid mass was carefully mixed over a period of 45 minutes at 150° C. After adding 0.5 kg. of cadmium yellow, the suspension obtained was carefully homogenised and then it was applied at 150° C. by pouring onto a road in order to form yellow lines for route direction purposes.

After cooling, the deposited product remained plastic, while having a high resistance to wear.

On average, 30,000 vehicles per month travelled over the yellow lines; after one year, these lines were still quite unchanged, whereas the comparison lines of known type, put down at the same place, were already seriously damaged.

EXAMPLE 10

To 86 kg. of molten sulphur, at 145° C., there were added in small portions 14 kg. of a condensation product of liquid polythioformaldehyde with 73% of S with methyl isobutyl ketone (prepared according to Example 7) and under the conditions indicated in Example 1. After adding 0.4 kg. of cadmium red and thorough homogenisation of the comoposition, the latter was employed as a coating on walls.

EXAMPLE 11

A preparation similar to that of Example 10 was obtained with 96 kg. of molten sulphur and 4 kg. of a polythioformaldehyde condensation product which was liquid at ambient temperature and which contained an average of 3.7 $CH_2S$ groups per molecule with cyclohexanone (prepared according to Example 6). The plastic composition likewise had an excellent wear resistance.

EXAMPLE 12

A condensation product of benzophenone with polythioformaldehyde (according to Example 8) was dissolved in the ratio of 8 kg. in 92 kg. of molten sulphur, in order to form a plasticised composition similar to that of the preceding examples, but harder than that of Example 1.

EXAMPLE 13

57 kg. of sulphur powder are mixed with 43 kg. of acetone-polythioformaldehyde polycondensate, prepared according to Example 4, and with 20 kg. of light burnt alumina. The mixture was heated to 150° C., stirred until completely homogenised. A fairly flexible paste was obtained which could be used as a mastic and especially for sealing joints or cracks in tiles or in concrete floors.

We claim:
1. A plastic composition comprising a homogeneous melt of 85 to 98 parts by weight of elementary sulphur with 15 to 2 parts by weight of a polythioformaldehyde represented by the formula $HS(CH_2S)_nH$ which contains 62% to 72% combined sulphur by weight and melts between 70° to 120° C., while $n$ is 3 to 7.

2. A plastic composition comprising a homogeneous melt of 85 to 98 parts by weight of elementary sulphur with 15 to 2 parts by weight of a polythioformaldehyde represented by the formula $HS(CH_2S)_nH$ which contains 72% to 76% by weight of combined sulphur and is liquid at ambient temperature, while the average value of $n$ is 3 to 4.

3. A plastic composition comprising a homogeneous melt of 85 to 98 parts by weight of elementary sulphur with 15 to 2 parts by weight of a polymer which results from the condensation of a ketone, having 2 to 12 carbon atoms in its molecule beside the carbon of the ketonic CO group, with a liquid polythioformaldehyde represented by the formula $HS(CH_2S)_nH$ wherein the average value of $n$ is 3 to 4, and the content in combined sulphur is 72% to 76% by weight.

4. A plastic composition comprising a homogeneous melt of 85 to 98 parts by weight of elementary sulfur with 15 to 2 parts by weight of at least one polymer selected from the group consisting of a polythioformaldehyde of formula $HS(CH_2S)_nH$ which contains 62 to 76% by weight of combined sulphur wherein the average value of $n$ ranges from 3 to 7 and polycondensates of said polythioformaldehyde with an organic compound selected from the group consisting of a ketone having 2 to 12 carbon atoms in its molecule beside the carbon of the ketonic CO group, phenol, urea, thiourea, dicyandiamide, styrene and maleic acid.

5. A plastic composition comprising a homogeneous melt of about 50 to 96% by weight of elementary sulfur and about 50 to 4% by weight of a polymer which results from the condensation of one mole of polythioformaldehyde of formula $HS(CH_2S)_nH$ which contains 62 to 76% by weight of combined sulphur wherein the average value $n$ ranges from 2 to 7 with one to 1.5 moles of a ketone having 2 to 12 carbon atoms in its molecule beside the carbon of the ketonic CO group.

6. A plastic composition comprising a homogeneous melt of 50 to 96% by weight of elementary sulfur and 50 to 4% by weight of a polymer which results from the condensation of one mole of liquid polythioformaldehyde represented by the formula $HS(CH_2S)_nH$ wherein the average value of $n$ ranges from 3 to 4, and the content in combined sulfur is 72 to 76% by weight, with 1 to 1.5 moles of a ketone having 2 to 12 carbon atoms in its molecule beside the carbon of the ketonic CO group.

7. A process of preparing a plastic composition comprising elemental sulfur and an organic substance selected from the group consisting of polythioformaldehyde of formula $HS(CH_2S)_nH$ which contains 62 to 76% by weight of combined sulphur wherein the average value of $n$ ranges from 3 to 7, and a condensation product of said polythioformaldehyde with an organic compound selected from the group consisting of a ketone having 2 ot 12 carbon atoms in its molecule beside the carbon of the ketonic CO group, phenol, urea, thiourea, dicyandiamide, styrene and maleic acid, said process comprising the steps of treating 85 to 98 parts by weight of molten sulfur with 15 to 2 parts by weight of said organic substance and homogenizing the resulting mixture.

8. A process of preparing a plastic composition comprising elemental sulfur and an organic substance selected from the group consisting of polythioformaldehyde of formula $HS(CH_2S)_nH$ which contains 62 to 76% by weight of combined sulphur wherein the average value of $n$ ranges from 3 to 7, and a condensation product of said polythioformaldehyde with an organic compound selected from the group consisting of a ketone having 2 ot 12 carbon atoms in its molecule beside the carbon of the ketonic CO group, phenol, urea, thiourea, dicyandiamide, styrene and maleic acid, said process comprising the steps of treating and homogenizing at a temperature ranging from 145° to 170° C. 85 to 98 parts by weight of elemental sulfur with 15 to 2 parts by weight of said organic substance in order to obtain a homogeneous melt.

References Cited

UNITED STATES PATENTS

| | | | |
|---|---|---|---|
| 1,991,765 | 2/1935 | Barks | 260—79 |
| 2,174,000 | 9/1939 | Hills et al. | 260—67 |
| 2,454,635 | 12/1948 | Curtis | 260—79 |
| 2,778,811 | 1/1957 | Ullrich | 260—64 |

FOREIGN PATENTS 639,724   5/1962   Canada.

ALEXANDER H. BRODMERKEL, *Primary Examiner.*
D. J. ARNOLD, *Examiner.*